United States Patent [19]

Mitarai et al.

[11] Patent Number: 5,039,424

[45] Date of Patent: Aug. 13, 1991

[54] METHOD FOR TREATING AN AMINE-CONTAINING WASTE WATER

[75] Inventors: Keiji Mitarai; Masahiko Fujii; Ieyoshi Inoue, all of Tokuyama; Sadakatsu Kumoi, Hikari, all of Japan

[73] Assignee: Tosoh Corporation, Shin-nanyo, Japan

[21] Appl. No.: 411,113

[22] Filed: Sep. 22, 1989

[30] Foreign Application Priority Data

Sep. 28, 1988 [JP] Japan ................................. 63-240951
Nov. 4, 1988 [JP] Japan ................................. 63-277383
Feb. 6, 1989 [JP] Japan ................................... 1-25764

[51] Int. Cl.$^5$ ............................................... C02F 1/28
[52] U.S. Cl. .................................... 210/669; 210/670; 210/677; 210/694
[58] Field of Search ................. 210/669, 670, 694, 677

[56] References Cited

U.S. PATENT DOCUMENTS 3,770,625 11/1973 Wallis et al. .......................... 210/36
4,305,827 12/1981 Sasaki ................................. 210/694

OTHER PUBLICATIONS

Patent Abstracts of Japan, vol. 7, No. 108, May 1983, Asahi Kasei Kogyo K.K.

*Primary Examiner*—Ivars Cintins
*Attorney, Agent, or Firm*—Oblon, Spivak, McClelland, Maier & Neustadt

[57] ABSTRACT

A method for treating an amine-containing waste water, which comprises conducting the waste water to active carbon.

11 Claims, No Drawings

METHOD FOR TREATING AN AMINE-CONTAINING WASTE WATER

The present invention relates to a method for treating an amine-containing waste water. More particularly, the present invention relates to a method for treating an amine-containing waste water discharged from an amine production plant with active carbon, to substantially reduce the COD (chemical oxygen demand) of the waste water.

For the treatment of waste waters discharged from plants, the methods and the optimum treating conditions vary depending upon the natures of the waste waters such as the types and amounts of the co-existing substances (i.e. inorganic substances and organic substances) contained in the waste waters or the objective COD concentration level required for treatment.

An amine-containing waste water or a waste water containing an amine and an inorganic salt, is produced from a plant for producing an amine by the reaction of an organic halogen compound and a nitrogen-containing compound. In view of its nature, the amine-containing waste water is usually treated by flocculation treatment by means of an anionic polymer flocculating agent. This method requires an expensive polymer flocculating agent. Further, it is thereby impossible to recover the useful amine from the waste water. Besides, the resulting sludge makes another problem for treatment. Particularly when an inorganic salt is present at a high concentration in the waste water, the flocculation-sedimentation method can not be a proper treating method.

Heretofore, it has been attempted to apply treatment with various adsorbents to the amine-containing waste water. As disclosed in Journal of Japanese Chemical Society 1985 (4) 802, active carbon has poor adsorptivity for a nitrogen-containing compound such as ammonia or an amine. To overcome the drawback of active carbon, silica-titania and silica-titania-magnesia gel have been proposed as highly active adsorbents. However, these adsorbents exhibits the removal ratio of 58% at best against a 100 ppm amine-containing waste water. As such, they are not fully satisfactory from the viewpoint of the removal ratio. Further, an oxide compound adsorbent such as silica-titania shows an acidic nature and is likely to elute to a liquid phase by a basic substance such as an amine, whereby such an adsorbent has a problem in life.

In Japanese Unexamined Patent Publication No. 49990/1987, a silica gel adsorbent is proposed to overcome the drawback that active carbon or active clay has poor adsorptivity. However, when a highly concentrated amine-containing waste water of a level of 20,000 ppm is treated with silica gel, the removal ratio is at a level of 57%, and the waste water still has a large COD. Therefore, this method is also not fully satisfactory as a treating method.

It has been desired to overcome the drawback of conventional solid acidic substances such as titanium oxide, active caly, silica gel and oxide compound gel i.e. the deterioration with time of the physical properties against a basic substance such as an amine and to provide an inexpensive adsorbent having a high level adsorptivity for an amine.

As described above, the technique for remarkably reducing the amine concentration in the waste water containing amine at a high level, can hardly be said to have industrially established. Particularly, it is strongly desired to develop an industrial treating technique whereby an amine is selectively removed and recovered from an amine-containing waste water in which an inorganic salt is present at a high concentration.

It is an object of the present invention to conduct adsorption treatment at a high removal ratio by means of active carbon which is available at an industrially low cost and to provide an industrially qualified high level of treating technique, which may satisfy the following objects.

1) Treating technique capable of adequately dealing with a change in the nature of the waste water without being influenced by the type (the chemical structure or the molecular weight) or the concentration of the amine contained in the waste water.

2) To attain a higher removal ratio than the conventional adsorbent treatment with titanium oxide, active clay, silica gel or an oxide compound gel.

3) To attain a low level of the COD of the waste water by the adsorption treatment at a high removal ratio.

4) Effective recovery of the amine adsorbed on active carbon.

As a result of a study on a method of reducing the COD of an amine-containing waste water, the present inventors have found that among various active carbons, coconut shell active carbon exhibits peculiarly excellent properties as the adsorbent. Further, it has been found that the adsorption treatment method by means of coconut shell active carbon is an industrially extremely advantageous method for reducing the COD of the amine-containing waste water wherein an inorganic salt is present at a high concentration.

According to the first aspect, the present invention provides a method for treating an amine-containing waste water, which comprises contacting the waste water to coconut shell active carbon.

Further, the present inventors have found that the removal ratio of the amine compound in the waste water can be remarkably improved by treating the waste water with active carbon in such a state that in the waste water, an alkali metal hydroxide or/and an alkaline earth metal hydroxide is present together with or without an inorganic salt.

Thus, according to the second aspect, the present invention provides a method for treating an amine-containing waste water, which comprises contacting the waste water to active carbon in the presence of at least $5 \times 10^{-4}$ mol/l of an alkali metal hydroxide and/or an alkaline earth metal hydroxide. In this method, at least 10 g/l of an inorganic salt may also be present during the contact.

Furthermore, the present inventors have conducted extensive researches with an aim to substantially reduce the COD of the amine-containing waste water and to develop a waste water treating system for a pollution-less amine production plant. As a result, they have succeeded in establishing a waste water treating technique capable of effectively recovering the amine without no substantial discharge of the amine from the system by conducting active carbon treatment after adjusting the pH of the amine-containing waste water discharged from the amine production step to a level within a predetermined range, followed by a step of desorbing the amine adsorbed on active carbon under certain specific conditions and improving the method of recovery of the amine from the desorbed amine solution.

Namely, according to the third aspect, the present invention provides a process for treating with active carbon, an amine-containing waste water or a waste water containing an inorganic salt and an amine, discharged from a plant for producing an amine by the reaction of an organic halogen compound and a nitrogen-containing compound, which comprises:

(1) a step of adsorbing the amine by adding an alkali metal hydroxide or an alkaline earth metal hydroxide to said waste water to adjust the pH to a level of at least 10.8 and contacting the mixture with active carbon, (2) a step of desorbing the amine by supplying a desorbing solution containing a mineral acid at a concentration of from 2 to 20% by weight, to a column packed with the active carbon having the amine adsorbed thereon, at a linear velocity of from 0.1 to 15 m/hr, and (3) a step of recovering the amine by supplying the desorbed amine solution to an amine production plant. To a desorbed amine solution having an amine concentration of less than 30 g/l out of the desorbed amine solution from the amine desorbing step (2), an alkali metal hydroxide or an alkaline earth metal hydroxide may be added to adjust the pH to a level of at least 10.8, and the mixture may then be recycled to the active carbon packed column as a feed solution for the amine adsorbing step (1). Further, to a desorbed amine solution having an amine concentration of less than 50 g/l out of the desorbed amine solution from the amine desorbing step (2), a mineral acid is added to adjust the concentration of the free mineral acid to a level of from 2 to 20% by weight, and the mixture thus obtained may be used as a desorbing solution for the amine desorbing step (2).

Now, the present invention will be described in detail with reference to the preferred embodiments.

Referring to the first aspect of the present invention, the amine compound in the waste water to be treated is not particularly limited so long as it is a compound having an amino group in its molecule. Namely, waste waters containing aliphatic amines or aromatic amines may be treated by the present invention. The aliphatic amines include, for example, alkylamines such as methylamine, dimethylamine, trimethylamine, propylamine, butylamine and dibutylamine, ethyleneamines such as ethylenediamine, piperazine, triethylenediamine, diethylenetriamine, N-aminoethylpiperazine, triethylenetetramine, tetraethylenepentamine and pentaethylenehexamine, polyalkylenepolyamines such as propanediamine, dipropylenetriamine, dimethylaminopropylamine, butandiamine, hexamethylenediamine and tetramethylhexamethylenediamine, N-alkylated polyalkylenetriamines, and oxygen-containing aliphatic amines such as morpholine, ethanolamine and aminoethylethanolamine. The aromatic amines include aniline, aminotoluene, phenylenediamine, pyridine, picoline, pyrazine and an alkyl pyrazine. The amine compound in the waste water may be present in the form of a single compound or in the form of a mixture of various amine compounds. The waste water may further contain alkanes, alkenes and aromatic compounds together with the amine compound. The method according to the first aspect of the present invention is particularly effective for the treatment of an amine waste water containing ethyleneamine as the main component.

There is no particular restriction as to the amine concentration in the waste water to be treated by the method according to the first aspect of the present invention. However, the waste water to be treated usually contains from 10 to 100,000 ppm of the amine. A waste water containing an amine at a high concentration of at least 100,000 ppm can be treated at a high removal ratio by the method according to the first aspect of the present invention. However, from the viewpoint of the load required during the recovery of the adsorbed amine, such may not necessarily be an economically advantageous method for waste water treatment.

The inorganic salt to be present in the waste water is preferably an inorganic salt wherein the cation portion thereof is an alkali metal or alkaline earth metla ion, and the anion portion is a halogen ion, a sulfuric acid ion or a carboxyl acid ion. The amine-containing waste water which contains these inorganic salts, is a waste water suitable for the active carbon contact treatment of the present invention, whereby the removal of amine can effectively and selectively be conducted by the method of the present invention. There is no particular restriction as to the concentration of such inorganic salts present in the waste water, and they may be present at any concentration so long as they are uniformly dissolved in the system.

The coconut shell active carbon to be used in the method according to the first aspect of the present invention may be any active carbon so long as it is produced from a coconut shell as the starting material, and there is no particular restriction as to the production history such as the process for its preparation or the manner for its activation. As to its form, it may be advantageously be used in the form of any one of granular carbon, pulverized carbon or powder carbon. A form suitable for the treatment may be selected as the case requires.

The waste water treating method by means of the active carbon may be conducted by a batch system, a continuous fixed bed system or a continuous fluidized bed system. An industrially advantageous system is selected depending upon the amount of the waste water to be treated, the scale of the treating installations, etc.

The contact of the waste water to the active carbon may be conducted at a temperature not higher than the boiling point of water. In the case of a waste water having a low viscosity, it is usual to conduct the treatment at a temperature of not higher than 70° C.

The treating time by a batch system varies depending upon the nature of the waste water and the amount of the active carbon. However, the adsorption equilibrium is usually reached by the contact for from 15 minutes to 24 hours.

The flow rate in the fixed bed flow system varies substantially depending upon the amount of the amine contained in the waste water or the nature such as the molecular weight of the amine. However, the waste water is usually passed through the fixed bed at a linear velocity of from 0.1 to 20 m/hr. It is possible to conduct the treatment at a linear velocity higher than 20 m/hr, but such a high velocity is not desirable since the concentration of the amine leaked in the treated solution tends to increase.

The method according to the first aspect of the present invention provides the following advantages (1) to (4). Thus, the adsorption treatment method by means of coconut shell active carbon is an industrially extremely advantageous method for reducing COD.

1) Among various active carbons, coconut shell active carbon has the largest adsorption capacity and is particularly effective for the treatment of the waste water containing low molecular weight amine compound such as ethylenediamine which is usually hardly adsorbable.

2) Coconut shell active carbon is less susceptible to a deterioration with time by a basic substance such as an amine, and the adsorption capacity in the presence of an inorganic salt is substantially larger than a solid acidic substance such as silica gel, titanium oxide or active clay.

3) Coconut shell active carbon has high hardness, whereby it is less susceptible to abration and has high durability. Further, it is durable against repeated cycles of adsorption-regeneration (using strong alkali and strong acid).

4) Coconut shell active carbon is inexpensive and is readily available on an industrial scale.

EXAMPLES 1 TO 10 AND COMPARATIVE EXAMPLES 1 TO 19

Into a 300 ml Erlenmeyer flask, 100 ml of the amine-containing waste water as identified in Table 1 (each containing 0.01 mol/l of NaOH except for Comparative Examples 16 to 19) was introduced, and 1 g of commercially available active carbon (powder) or acidic oxide (granules, from 2 to 4 mm in diameter) was added thereto. The mixture was shaken for 2 hours (24 hours in the case of the acidic oxide) on a warm water bath at 30° C. Then, active carbon or acidic oxide was separated and removed, and the amine concentration in the solution was measured as the total organic carbon. The results are shown in Table 1.

TABLE 1

|  |  | Waste water composition | | | | Amine concentration after treatment (mg/l) | Amount of adsorbed amine (mg/g-AC) | Removal rate (%) |
|---|---|---|---|---|---|---|---|---|
|  |  | Amine | | Inorganic salt | | | | |
|  | Active carbon | Type | Concentration (mg/l) | Type | Concentration (g/l) | | | |
| Example | | | | | | | | |
| 1 | Coconut shell type A | Ethylenediamine | 100 | NaCl | 300 | 36 | 6.4 | 64.0 |
| 2 | Coconut shell type A | Ethylenediamine | 1000 | NaCl | 300 | 620 | 38.0 | 38.0 |
| 3 | Coconut shell type A | Ethylenediamine | 10000 | NaCl | 300 | 9200 | 80.0 | 8.0 |
| 4 | Coconut shell type B | Ethylenediamine | 1000 | NaCl | 300 | 619 | 38.1 | 38.1 |
| 5 | Coconut shell type C | Ethylenediamine | 1000 | NaCl | 300 | 610 | 39.0 | 39.0 |
| 6 | Coconut shell type D | Ethylenediamine | 1000 | NaCl | 300 | 640 | 36.0 | 36.0 |
| 7 | Coconut shell type A | Triethylene-tetramine | 2000 | $Na_2SO_4$ | 100 | 550 | 145 | 72.5 |
| 8 | Coconut shell type A | Waste water from ethyleneamine producing plant | 640 mg-c/l (As organic carbon) | NaCl | 300 | 156 (As organic carbon) | 48.4 (As organic carbon) | 75.6 |
| 9 | Coconut shell type A | Butylamine | 1000 | NaBr | 100 | 175 | 82.5 | 82.5 |
| 10 | Coconut shell type A | Hexamethylene-diamine | 1000 | — | — | 390 | 61.0 | 61.0 |
| Comparative Example | | | | | | | | |
| 1 | Coal type C | Ethylenediamine | 100 | NaCl | 300 | 47 | 5.3 | 53.0 |
| 2 | Coal type C | Ethylenediamine | 1000 | NaCl | 300 | 696 | 30.4 | 30.4 |
| 3 | Coal type C | Ethylenediamine | 10000 | NaCl | 300 | 9350 | 65.0 | 6.5 |
| 4 | Coal type B | Ethylenediamine | 1000 | NaCl | 300 | 691 | 30.9 | 30.9 |
| 5 | Coal type D | Ethylenediamine | 1000 | NaCl | 300 | 695 | 30.5 | 30.5 |
| 6 | Coal type E | Ethylenediamine | 1000 | NaCl | 300 | 793 | 20.7 | 20.7 |
| 7 | Coal type F | Ethylenediamine | 1000 | NaCl | 300 | 730 | 27.0 | 27.0 |
| 8 | Coal type C | Triethylene-tetramine | 2000 | $NaSo_4$ | 100 | 645 | 136 | 67.8 |
| 9 | Coal type C | Waste water from ethyleneamine producing plant | 640 mg-c/l (As organic carbon) | NaCl | 300 | 304 (As organic carbon) | 33.4 (As organic carbon) | 52.5 |
| 10 | Coal type C | Butylamine | 1000 | NaBr | 100 | 246 | 75.4 | 75.4 |
| 11 | Coal type C | Hexamethylene-diamine | 1000 | — | — | 470 | 53.0 | 53.0 |
| 12 | Charcoal type D | Ethylenediamine | 100 | NaCl | 300 | 59 | 4.1 | 41.0 |
| 13 | Charcoal type D | Ethylenediamine | 1000 | NaCl | 300 | 679 | 32.1 | 32.1 |
| 14 | Charcoal type F | Ethylenediamine | 100 | NaCl | 300 | 63 | 3.7 | 37.0 |
| 15 | Charcoal type F | Ethylenediamine | 1000 | NaCl | 300 | 703 | 29.7 | 29.7 |
| 16 | (Acidic oxides) $SiO_2$ | Ethylenediamine | 1000 | NaCl | 300 | 922 | 7.8 | 7.8 |
| 17 | $SiO_2$—$TiO_2$ | Ethylenediamine | 1000 | NaCl | 300 | 986 | 1.4 | 1.4 |
| 18 | $TiO_2$ | Ethylenediamine | 1000 | NaCl | 300 | 950 | 2.0 | 2.0 |
| 19 | $SiO_2$—$Al_2O_3$ | Ethylenediamine | 1000 | NaCl | 300 | 978 | 2.2 | 2.2 |

Now, the method according to the first aspect of the present invention will be described in detail with reference to Examples. However, it should be understood that the present invention is by no means restricted to such specific Examples.

EXAMPLES 11 TO 20 AND COMPARATIVE EXAMPLE 20

Into a glass column having an inner diameter of 2.5 cm and equipped with a jacket, 1 l of commercially available granular coconut shell active carbon or granular silica gel was packed. The waste water having a different nature as identified in Table 2 (each containing 0.01 mol/l of NaOH except for Comparative Example 20) was passed through the active carbon or silica gel packed column at a flow rate of 1.5 l/hr. The adsorbing operation was conducted at 40° C. The eluate was sampled at predetermined intervals, and the concentration of the organic substance in the eluate was measured as the total organic carbon. In Table 2, the amine concentration contained in the treated solution at the time when a predetermined amount was passed, is shown.

The silica gel used in Comparative Example 20 was broken to produce a substantial amount of fine particles. With the silica gel after use (as dried), a deterioration such as the surface turbidity was observed.

method according to the first aspect of the present invention. Likewise, the amine concentration in the waste water to which this method may be applied is not particularly restricted and may be the same as described with respect to the method according to the first aspect of the present invention.

As the alkali metal hydroxide and the alkaline earth metal hydroxide to be used in this method, lithium hydroxide, sodium hydroxide, potassium hydroxide, cesium hydroxide and calcium hydroxide are useful. It is important that the active carbon treatment is conducted after adding such a metal hydroxide to bring its concentration in the waste water to a level of at least $5 \times 10^{-4}$ mol/l, preferably at least $2 \times 10^{-3}$ mol/l. If the concentration of such a metal hydroxide in the waste water is less than $5 \times 10^{-4}$ mol/l, the removal ratio of the amine

TABLE 2

| | | Waste water composition | | | | Amount of treated water* (l) | Amine concentration after treatment (mg/l) |
|---|---|---|---|---|---|---|---|
| | | Amine | | Inorganic salt | | | |
| | Active carbon | Type | Concentration (mg/l) | Type | Concentration (g/l) | | |
| Example | | | | | | | |
| 11 | Coconut shell type A | Ethylenediamine | 100 | NaCl | 300 | 41 | 2 |
| 12 | Coconut shell type A | Ethylenediamine | 1000 | NaCl | 300 | 12 | 1 |
| 13 | Coconut shell type B | Ethylenediamine | 1000 | NaCl | 300 | 12 | 1 |
| 14 | Coconut shell type C | Ethylenediamine | 1000 | NaCl | 300 | 12 | 1 |
| 15 | Coconut shell type D | Ethylenediamine | 1000 | NaCl | 300 | 12 | 2 |
| 16 | Coconut shell type A | Ethylenediamine | 100 | — | — | 8 | 1 |
| 17 | Coconut shell type A | Pyperadine | 700 | NaCl | 300 | 18 | 2 |
| 18 | Coconut shell type A | Triethylenetetramine | 2000 | NaCl | 300 | 14 | 1 |
| 19 | Coconut shell type A | Waste water from ethyleneamine producing plant | 680 mg-c/l (As organic carbon) | NaCl | 300 | 11 | 3 (As organic carbon) |
| 20 | Coconut shell type B | Waste water from ethyleneamine producing plant | 680 mg-c/l (As organic carbon) | NaCl | 300 | 12 | 4 (As organic carbon) |
| Comparative Example | | | | | | | |
| 20 | Silica gel | Ethylenediamine | 1000 | NaCl | 300 | 20 | 890 |

*Amount of the waste water passed until breakthrough point

EXAMPLE 21

With respect to the active carbon used for the repeated operation of adsorption-regeneration, the hardness was compared before and after the waste water treatment. The results thereby obtained are shown in Table 3.

TABLE 3

| Active carbon | | Hardness (kg/cm²) |
|---|---|---|
| Coconut shell type | Before treatment | 7-8 |
| | After 6 repeated operations | 8 |
| | After 50 repeated operations | 3.2 |
| Coal type | Before treatment | 2.4 |
| | After 6 repeated operations | 1.5 |

Now, the second aspect of the present invention will be described in detail, which is directed to a method which comprises contacting an amine-containing waste water to active carbon in the presence of at least $5 \times 10^{-4}$ mol/l of an alkali metal hydroxide and/or an alkaline earth metal hydroxide.

The amine compound in the waste water to be treated by the method of this second aspect of the present invention is the same as described with respect to the from the waste water tends to be low, and it becomes difficult to accomplish the desired high level treatment of waste water. The optimum concentration of the metal hydroxide in the waste water varies depending upon the nature of the waste water and may suitably be adjusted as the case requires.

It is possible to synergistically improve the removal ratio of the amine in the waste water by permitting an inorganic salt to be present while maintaining the metal hydroxide concentration in the waste water to the predetermined level. There is no particular restriction as to the type of the inorganic salt. The cation portion of the inorganic salt may be selected from alkali metal and alkaline earth metal ions, and the anion portion may be selected from halogen ions, a sulfuric acid ion and a carboxylic acid ion, so that the inorganic ion added will not create secondary pollution depending upon the nature of the waste water. For example, sodium chloride, calcium chloride, sodium sulfate, sodium carbonate, sodium bromide, calcium bromide and cesium chloride may be mentioned. The concentration of such an inorganic salt is adjusted to be at least 10 g/l, preferably at least 50 g/l, in the waste water, followed by the active carbon treatment. If the concentration of the inorganic salt in the waste water is less than 10 g/l, the improvement in the removal ratio of the amine will be very small. In the process for producing ethyleneamine by a dichloroethane method, hydrochloric acid formed by the reaction step is neutralized by an alkali metal hydroxide or an alkaline earth metal hydroxide to form an alkali metal chloride or an alkaline earth metal chloride. If the alkali metal hydroxide and/or the alkaline earth metal hydroxide concentration in the aqueous solution is adjusted to the level specified by the method of the present invention i.e. at least $5 \times 10^{-4}$ mol/l when such an amine-containing aqueous solution of a by-product salt is discharged, the subsequent active carbon treatment can be conducted at a high level of the amine removal ratio. The metal hydroxide may be added in an excess amount during the neutralization of the amine producing process, or may be added prior to the active carbon treatment.

As the active carbon to be used in this method, active carbon of any one of the charcoal type, coal type and coconut shell type which is used commonly as an adsorbent or as a water treating agent, may effectively be employed. Among them, coconut shell type active carbon is industrially extremely useful for the treatment of this method. The shape may be granular or powdery.

The treating conditions by means of the active carbon including the temperature, the contact time and the flow rate of the waste water, may be the same as described with respect to the method according to the first aspect of the present invention.

By the application of the method according to the second aspect of the present invention to the active carbon treatment of an amine-containing waste water, the amine concentration in the treated water can remarkably be reduced, and the amine removal ratio can be maintained at a high level. Thus, it has been made possible to attain a high level treatment of waste water. Further, the amine-adsorbing capacity of the active carbon is thereby increased, and the regeneration cycle interval of the active carbon is reduced, so that the operation of the plant will be facilitated.

It is generally known that a waste water undergoes a property change. For example, in the case of an ethyleneamine production plant, the amine concentration or the type of the amine (such as ethylenediamine, diethylenetriamine or triethylenetetramine) in the waste water discharged from the plant varies depending upon the operation condition of the plant. The method according to the second aspect of the present invention has a feature that a high level treatment of waste water can be maintained constantly while accommodating the change in the nature of the waste water.

An industrial plant for producing a useful amine compound by the reaction of a halogenated organic substance with ammonia or with an amine, is common. From such a plant, an inorganic salt is usually discharged together with the amine. When the method of the present invention is applied to the treatment of such a waste water, the amount of the amine adsorbed on the active carbon is synergistically increased to provide a very effective waste water treatment technique.

Among various active carbons, coconut shell active carbon has a particularly large adsorbing capacity for the waste water of the type to be treated by the present invention and is very advantageous from the viewpoint of the control of the operation of the treatment plant.

Now, the second aspect of the present invention will be described in further detail with reference to Examples. However, it should be understood that the present invention is by no means restricted by such specific Examples.

EXAMPLES 22 TO 33 AND COMPARATIVE EXAMPLES 21 TO 23

Into a glass column having an inner diameter of 2.5 cm and equipped with a jacket, 1 l of granular active carbon as identified in Table 4 was packed. A solution obtained by adding to a waste water having various properties (the type and the amount of the amine compound) as identified in Table 4 an alkali metal hydroxide or an alkaline earth metal hydroxide at a predetermined concentration, was passed through the column packed with the active carbon at a feeding rate of 1.5 l/hr. The adsorption operation was conducted at 40° C. The eluate was sampled at predetermined intervals, and the concentration of the organic substance in the eluate was measured as the total organic carbon. The concentration of the organic substance contained in the treated solution at the time when a predetermined amount was eluated, is shown in Table 4.

In Comparative Examples 21 to 23, the treatment was conducted in the same manner as in Example 22 except that no alkali metal hydroxide or alkaline earth metal hydroxide was added to the waste water.

TABLE 4

| | Waste water composition | | | | | | | Treated solution | |
|---|---|---|---|---|---|---|---|---|---|
| | Amine | | Inorganic salt | | Metal hydroxide | | | | Amine |
| | Type | Concentration (mg/l) | Type | Concentration (g/l) | Type | Concentration (mol/l) | Active carbon | Eluted amount (l) | Concentration (mg/l) |
| Example | | | | | | | | | |
| 22 | Ethylenediamine | 100 | — | — | Caustic soda | $1 \times 10^{-3}$ | Coal type | 30 | 4 |
| 23 | Ethylenediamine | 1000 | — | — | Caustic soda | $9 \times 10^{-3}$ | Coal type | 6 | 1 |
| 24 | Ethylenediamine | 1000 | — | — | Caustic soda | $9 \times 10^{-3}$ | Coconut shell type | 8 | 1 |
| 25 | Ethylenediamine | 1000 | Sodium chloride | 280 | Caustic soda | $2 \times 10^{-2}$ | Coal type | 9 | 8 |
| 26 | Ethylenediamine | 1000 | Sodium chloride | 280 | Slaked lime | $2 \times 10^{-2}$ | Coconut shell type | 12 | 3 |
| 27 | Ethylenediamine | 1000 | Calcium chloride | 100 | Caustic soda | $3 \times 10^{-2}$ | Coal type | 8 | 10 |
| 28 | Triethylenetetramine | 2000 | Sodium bromide | 200 | Caustic potash | $1 \times 10^{-2}$ | Coal type | 12 | 1 |
| 29 | p-Phenylenediamine | 1000 | Potassium chloride | 150 | Caustic soda | $7 \times 10^{-3}$ | Coal type | 29 | 0 |
| 30 | Waste water from ethylenediamine producing plant | 500 (as organic carbon) | Sodium chloride | 300 | Caustic soda | $2 \times 10^{-2}$ | Coal type | 11 | 5 (As organic carbon) |
| 31 | Waste water from | 500 (As | Sodium | 300 | Caustic soda | $2 \times 10^{-2}$ | Coconut | 15 | 4 |

TABLE 4-continued

| | | Waste water composition | | | | | | Treated solution | |
|---|---|---|---|---|---|---|---|---|---|
| | Amine | | Inorganic salt | | Metal hydroxide | | | | Amine |
| | Type | Concentration (mg/l) | Type | Concentration (g/l) | Type | Concentration (mol/l) | Active carbon | Eluted amount (l) | Concentration (mg/l) |
| 32 | ethylenediamine producing plant Pentaethylenehexamine | organic carbon) 800 | chloride — | — | Caustic soda | $8 \times 10^{-3}$ | shell type Coal type | 30 | (As organic carbon) 2 |
| 33 | Aminoethylethanolamine | 850 | Sodium sulfate | 130 | Caustic soda | $6 \times 10^{-3}$ | Coal type | 10 | 3 |
| Comparative Example | | | | | | | | | |
| 21 | Ethylenediamine | 1000 | — | — | — | — | Coal type | 6 | 250 |
| 22 | Waste water from ethyleneamine producing plant | 500 (As organic carbon) | Sodium chloride | 300 | — | — | Coal type | 10 | 105 (As organic carbon) |
| 23 | Triethylenetetramine | 2000 | — | — | — | — | Coal type | 10 | 220 |

EXAMPLES 34 TO 47 AND COMPARATIVE EXAMPLES 24 TO 34

Into a 300 ml Erlenmeyer flask, 100 ml of the amine-containing waste water as identified in Table 5 was introduced, and an alkali metal hydroxide or an alkaline earth metal hydroxide was added to a predetermined concentration, as the case requires. Then, 1 g of the active carbon (powder) or the acidic oxide (granules: from 2 to 4 mm in diameter) as identified in Table 5 was added thereto, and the mixture was shaken for 2 hours (24 hours in the case of the acidic oxide) on a warm water bath at 30° C. Then, the active carbon or the acidic oxide was separated and removed, and the amine concentration in the solution was measured as the total organic carbon. The results are shown in Table 5 as the amine concentration after the treatment and the amount of adsorbed amine.

TABLE 5

| | Waste water composition | | | | | | | Amine concentration after treatment (mg/l) | Adsorptivity | |
|---|---|---|---|---|---|---|---|---|---|---|
| | Amine | | Inorganic salt | | Metal hydroxide | | | | Amount of adsorbed amine (mg/g-AC) | Removal rate (%) |
| | Type | Concentration (mg/l) | Type | Concentration (g/l) | Type | Concentration (mol/l) | Active carbon | | | |
| Example | | | | | | | | | | |
| 34 | Ethylenediamine | 1000 | Sodium chloride | 50 | Sodium hydroxide | $2 \times 10^{-2}$ | Coal type | 744 | 25.6 | 25.6 |
| 35 | Ethylenediamine | 1000 | Sodium chloride | 300 | Sodium hydroxide | $2 \times 10^{-2}$ | Coal type | 696 | 30.4 | 30.4 |
| 36 | Ethylenediamine | 1000 | — | — | Sodium hydroxide | $2 \times 10^{-2}$ | Coconut shell type | 760 | 24.0 | 24.0 |
| 37 | Ethylenediamine | 1000 | Sodium chloride | 300 | Sodium hydroxide | $2 \times 10^{-2}$ | Coconut shell type | 620 | 38.0 | 38.0 |
| 38 | Ethylenediamine | 100 | Sodium chloride | 300 | Sodium hydroxide | $2 \times 10^{-2}$ | Coal type | 44 | 5.6 | 56.0 |
| 39 | Ethylenediamine | 10000 | Sodium chloride | 300 | Sodium hydroxide | $2 \times 10^{-2}$ | Coal type | 9340 | 66.0 | 6.6 |
| 40 | Ethylenediamine | 1000 | Sodium sulfate | 100 | Sodium hydroxide | $5 \times 10^{-3}$ | Coal type | 716 | 28.4 | 28.4 |
| 41 | Triethylenetetramine | 2000 | Sodium chloride | 300 | Lime | $4 \times 10^{-2}$ | Coal type | 650 | 135 | 67.5 |
| 42 | Waste water from ethyleneamine producing plant | 640 (As organic carbon) | Sodium chloride | 300 | Sodium hydroxide | $2 \times 10^{-2}$ | Coal type | 253 (As organic carbon) | 38.7 (As organic carbon) | 60.5 |
| 43 | Waste water from ethyleneamine producing plant | 640 (As organic carbon) | Sodium chloride | 300 | Sodium hydroxide | $2 \times 10^{-2}$ | Coconut shell type | 156 | 48.4 | 75.6 |
| 44 | Pentaethylenehexamine | 2000 | Sodium chloride | 300 | Sodium hydroxide | $5 \times 10^{-3}$ | Coconut shell type | 550 | 145 | 72.5 |
| 45 | Butylamine | 1000 | Sodium chloride | 100 | Sodium hydroxide | $2 \times 10^{-2}$ | Coal type | 248 | 75.2 | 75.2 |
| 46 | Monoethanolamine | 1000 | Sodium chloride | 100 | Sodium hydroxide | $2 \times 10^{-2}$ | Coal type | 825 | 17.5 | 17.5 |
| 47 | Hexamethylenediamine | 1000 | Sodium chloride | 100 | Sodium hydroxide | $2 \times 10^{-2}$ | Coal type | 175 | 82.5 | 82.5 |
| Comparative Example | | | | | | | | | | |
| 24 | Ethylenediamine | 100 | — | — | — | — | Coal type | 64 | 3.6 | 36.0 |

TABLE 5-continued

| | Waste water composition | | | | | | | Amine concentration after treatment (mg/l) | Adsorptivity Amount of adsorbed amine (mg/g-AC) | Removal rate (%) |
|---|---|---|---|---|---|---|---|---|---|---|
| | Amine | | Inorganic salt | | Metal hydroxide | | | | | |
| | Type | Concentration (mg/l) | Type | Concentration (g/l) | Type | Concentration (mol/l) | Active carbon | | | |
| 25 | Ethylenediamine | 1000 | — | — | — | — | Coal type | 775 | 22.5 | 22.5 |
| 26 | Ethylenediamine | 10000 | — | — | — | — | Coal type | 9590 | 41.0 | 4.1 |
| 27 | Triethylene-tetramine | 2000 | — | — | — | — | Coal type | 920 | 108 | 54.0 |
| 28 | Waste water from ethyleneamine producing plant | 640 (As organic carbon) | Sodium chloride | 300 | — | — | Coal type | 304 (As organic carbon) | 33.4 (As organic carbon) | 47.5 |
| 29 | Butylamine | 1000 | — | — | — | — | Coal type | 518 | 48.2 | 48.2 |
| 30 | Monoethanolamine | 1000 | — | — | — | — | Coal type | 888 | 11.2 | 11.2 |
| 31 | Hexamethylene-diamine | 1000 | — | — | — | — | Coal type | 470 | 53.0 | 53.0 |
| 32 | Ethylenediamine | 1000 | Sodium chloride | 300 | — | — | $SiO_2$ | 922 | 7.8 | 7.8 |
| 33 | Ethylenediamine | 1000 | Sodium chloride | 300 | — | — | $SiO_2-TiO_2$ | 986 | 1.4 | 1.4 |
| 34 | Ethylenediamine | 1000 | Sodium chloride | 300 | — | — | $SiO_2-Al_2O_3$ | 978 | 2.2 | 2.2 |

Now, the third aspect of the present invention will be described in detail, which is concerned with a method for treating with active carbon an amine-containing waste water or a waste water containing an inorganic salt and an amine, discharged from a plant for producing an amine by the reaction of an organic halogen compound and a nitrogen-containing compound.

The waste water treatment method according to this third aspect of the present invention is effectively applied to an amine production plant wherein an organic halogen compound and a nitrogen-containing compound are used as the starting materials.

The organic halogen compound includes aliphatic halogen compounds and aromatic halogen compounds having a halogen such as chlorine, bromine, fluorine or iodine as a substituent. Specifically, it includes mono and polyhalogenated aliphatic compounds such as methyl chloride, methyl bromide, butyl chloride, dichloroethane, dibromoethane, chlorobromoethane, dichlorobutane, benzyl dichloride, 2-bromo-1-phenylethane, a fluoroalkyl carboxylic acid, methyl iodide and an alkylene diiodide, and mono and polyhalogenated aromatic compounds such as chlorobenzene, dichlorobenzene, dibromobenzene, fluorobenzene, chlorobenzyl chloride, bromotoluene and chloronaphthalene. Further, these halogen-containing compounds may have a functional group such as an ether group, an ester group, an amide group, a thioether group, a carbonyl group or a carboxyl group in their molecules.

The nitrogen-containing compound includes ammonia and compounds having a primary amino group or a secondary amino group in their molecules. Specifically, such a nitrogen-containing compound includes, for example, alkyl amines such as methylamine, propylamine, diethylamine, octylamine and dilaurylamine, polyalkylenepolyamines such as ethylenediamine, piperazine, diethylenetriamine, propylenediamine, hexamethylenediamine, tetraethylenepentamine and polyethyleneimine, and aromatic amines such as aniline, phenylenediamine, aminophenol and aminonaphthalene.

The present invention is effectively applicable as a waste water treating method to an amine production plant using these starting materials, for example, an ethylene amine production plant using dichloroethane and ammonia, a phenylenediamine production plant using dichlorobenzene and ammonia, or the laurylethylenediamine production plant using lauryl bromide and ethylenediamine.

The method according to the third aspect of the present invention is not limited in its application to the above specific embodiments and can be applied widely to an amine production plant using an organic halogen compound and a nitrogen-containing compound.

There is no particular restriction as to the amine concentration in the waste water to which the method of the present invention may be applied. However, the waste water to be treated usually contains from 10 to 100,000 ppm of an amine or amines. Even when the waste water contains a high concentration of an amine at a level of higher than 100,000 ppm, the method of the present invention may still be applicable at a high removal ratio. However, such an application may not necessarily be economically advantageous from the viewpoint of the recovery load of the adsorbed amine. In such a case, the method of the present invention may effectively be applied by reducing the concentration by e.g. dilution.

The inorganic salt to be present in the waste water and its concentration may be the same as described with respect to the methods according to the first and second aspects of the present invention.

The active carbon to be used in this embodiment may be of a charcoal type, a coal type or a coconut shell type, which is commonly used as an adsorbent or a water treating agent. Among them, coconut shell active carbon is particularly effective for the treatment of this embodiment. It may be granular or powdery.

In the amine adsorbing step in this embodiment, an alkali metal hydroxide or an alkaline earth metal hydroxide is added to the amine-containing waste water discharged from the plant to adjust the pH to a level of at least 10.8, preferably at least 11.0, and then the mixture is contacted with the active carbon, whereby a high level removal ratio of the amine can be attained. When an amine-containing waste water having a pH of lower than 10.8 is subjected to the active carbon treatment, the amount of amine leaked will be substantial, whereby it is hardly possible to attain a high level treatment of waste water.

As the alkali metal hydroxide, sodium hydroxide or potassium hydroxide will be used, and as the alkaline earth metal hydroxide, calcium hydroxide or magnesium hydroxide will be used, from the economical viewpoint. Usually, it is advantageous to use sodium hydroxide or potassium hydroxide. However, the present invention is not limited to such alkali metal hydroxides.

For the waste water treatment by active carbon, a batch system, a continuous fixed bed system or a continuous fluidized bed system may be employed. Among them, the active carbon treatment method of a continuous system is particularly advantageous from the industrial viewpoint.

The contact of the waste water to the active carbon is conducted usually at a temperature not higher than the boiling point of water. In the case of a waste water having a low viscosity, the treatment is conducted usually at a temperature of not higher than 70° C.

The treating time in the batch system varies depending upon the nature of the waste water and the amount of the active carbon. However, adsorption equilibrium is usually reached by the contact for from 15 minutes to 24 hours.

The flow rate in the fixed bed and fluidized bed system is substantially affected by the amount of the amine contained in the waste water and by the properties of the amine such as the molecular weight. The flow rate is usually from 0.1 to 20 m/hr in linear velocity. The treatment may be conducted at a linear velocity of higher than 20 m/hr. However, such is not desirable, since the concentration of the amine leaked into the treated solution tends to increase.

The amine adsorbed on the active carbon by the above operation will then be desorbed by the following operation.

As the desorbing solution, an aqueous mineral acid solution having a concentration of from 2 to 20% by weight is usually employed. Mineral acids such as sulfuric acid, nitric acid and phosphoric acid may be employed. However, hydrochloric acid is most effective for the desorption of the amine compound derived from an organic halogen compound according to the present invention. If the concentration is less than 2% by weight, the amine concentration in the desorbed amine solution tends to be substantially low, such being industrially undesirable. If the concentration is higher than 20% by weight, the amine concentration in the desorbed amine solution tends to be substantially low, such being undesirable.

In the case of an active carbon packed column system, the feeding rate of the desorbing solution is most preferably from 0.1 to 15 m/hr as the linear velocity. A feeding rate of lower than 0.1 m/hr is disadvantageous from the viewpoint of the productivity. Further, if the feeding rate exceeds 15 m/hr, the amine concentration in the desorbed amine solution tends to be low, and the desorption efficiency will deteriorate.

The amount of the mineral acid to be used varies depending upon the desorbing conditions. However, the mineral acid is used usually from 1 to 5 times in equivalent, preferably from 1 to 3 times in equivalent to the nitrogen of the adsorbed amine. If the amount is less than 1 equivalent, the desorption of the amine will be incomplete. The temperature of the desorbing solution supplied is usually within a range of from 0° to 100° C., preferably from 0° to 75° C. The feeding at a desorbing solution temperature of higher than 75° C. is not advisable, since there will be a deterioration in the desorbing efficiency.

The desorbed amine solution containing the amine and the mineral acid is supplied to an amine production plant, whereupon the amine will be recovered in the separation and purification section in the plant. The entire desorbed amine solution may be treated by the amine production plant. Otherwise, the desorbed amine solution may be fractionated depending upon the concentration in the solution, followed by the following treatment.

Namely, a desorbed amine solution having an amine concentration of less than 30 g/l is adjusted to a pH of at least 10.8, preferably at least 11.0 by an addition of an alkali and then supplied to the active carbon column as a feed solution for the amine adsorbing step. By this operation, the load for treating the desorbed amine solution in the separation and purification section in the production plant can be reduced.

Further, to a desorbed amine solution having a low amine concentration of less than 50 g/l, a mineral acid is added to adjust the free mineral acid concentration to from 2 to 20% by weight, and the mixture is then used as a desorbing solution for the amine desorbing step. By this operation, the amine concentration in the desorbed amine solution can remarkably be increased, so that the load to the amine recovery apparatus can substantially be reduced. If a solution prepared by adding a mineral acid to a desorbed amine solution having an amine concentration of 50 g/l or higher is used as a desorbing solution, the amine desorbing efficiency from the active carbon tends to be low, and such is not advisable from the viewpoint of the operation.

As described above, the desorbed amine solution may be fractionated into three fractions depending upon the amine concentration. Otherwise, it may be divided into two fractions with a dividing line at an amine concentration of 50 g/l or 30 g/l to treat them respectively.

From a plant for producing an amine by the reaction of an organic halogen compound and a nitrogen-containing compound, it is usual that an amine-containing waste water wherein an inorganic salt is present in a high concentration, is discharged. The application of the adsorption treatment method by means of active carbon according to the present invention to the waste water of such nature, brings about a synergistic increase in the amount of the amine adsorbed on the active carbon, whereby the regeneration cycle number of the active carbon can be reduced, and the control of the operation of the plant will be facilitated. Especially, the amine concentration in the treated solution is remarkably reduced, whereby high level treatment of waste water can be attained.

Further, the method according to this third aspect of the present invention has a feature that while accommodating the change in the nature of waste water, the high level of waste water treatment can be maintained constantly, as described above with respect to the method according to the second aspect of the present invention. By the application of the conditions specified in the third aspect of the present invention to the amine desorbing step, the desorption ratio of the amine from the active carbon can be maintained substantially 100%, and as a result, a long useful life of the active carbon can be attained. Further, it is possible to obtain the desorbed amine solution with a high concentration of the amine, whereby the load to the amine recovery operation can remarkably be reduced. The desorbed amine solution thus obtained is supplied to the separation and purification section in the amine production plant, whereby the useful amine is recovered. Further, depending upon the amine concentration in the desorbed amine solution, the treating method may be optionally changed, whereby the efficiency for the amine recovery can be improved.

The feature of the waste water treatment method according to this third aspect of the present invention is to capture the amine in the waste water at a removal ratio of almost 100% and to make it possible to realize a completely pollution-less production plant by adopting an efficient and completely closed system.

Now, the third aspect of the present invention will be described in further detail with reference to Examples. However, it should be understood that the present invention is by no means restricted to such specific Examples.

EXAMPLE 48

To a waste water containing 300 g/l of sodium chloride and 1,100 mg/l of ethyleneamine, discharged from a plant for producing ethyleneamine by a dichloroethane method, sodium hydroxide was added to adjust the pH to 11.2. 200 l of this waste water was passed through a glass column packed with 4 l of granular coconut shell active carbon and equipped with a jacket, at a linear velocity of 3 m/hr at a liquid temperature of 60° C. The ethyleneamine concentration in the treated solution was analyzed by a TOC meter and a Kjeldahl method and found to be 2 ppm, and the amine removal ratio was 99.8%. Then, 4 l of water was passed through the column for washing the column. Then, 4.5 l of a desorbing solution having a hydrochloric acid concentration of 7.3% was passed through the column at a linear velocity of 3 m/hr and the liquid temperature of 40° C. Further, 27 l of water was passed through the column. The desorbed amine solution was divided into three fractions depending upon the amine concentration, and the amine concentration of each solution was measured. The amine concentration of solution A was 85 g/l, that of solution B was 7 g/l, and that of solution C was 1 g/l. The amine in solution A was quantitatively recovered by the operation usually conducted in the separation and purification section in the amine production plant. The amine recovery ratio based on the amine in the waste water was 70%.

EXAMPLE 49

180 l of a waste water containing sodium chloride and ethyleneamine at the same concentrations as in Example 48 and 25 l of solution C obtained in Example 48 (part of the desorbed amine solution, which is an aqueous solution containing 1 g/l of ethyleneamine and hydrochloric acid) were mixed, and 85 g of sodium hydroxide was added thereto to adjust the pH to 11.5. The adjusted waste water was passed through the same coconut shell active carbon packed column as in Example 48 at a linear velocity of 5 m/hr at a liquid temperature of 40° C. The amine concentration in the solution passed through the packed column was analyzed by a TOC meter and a Kjeldahl method and found to be 8 ppm. Thus, the removal ratio was 99.3%. Then, 4 l of water was passed through the column to wash the column.

Then, to solution B obtained in Example 48 (the amine desorbed solution containing 8 g/l of ethyleneamine and hydrochloric acid), a 35% hydrochloric acid aqueous solution was added to adjust the free hydrochloric acid concentration to 9.2%, and the adjusted solution was used as a desorbing solution. 5.5 l of this desorbing solution was passed through the active carbon column at a linear velocity of 2 m/hr at a liquid temperature of 35° C. Then, 27 l of water was passed through the column to obtain a desorbed amine solution. The desorbed amine solution was divided into three fractions depending upon the amine concentration. The amine concentration of solution A was 95 g/l, that of solution B was 18 g/l and that of solution C was 1 g/l. Solutions A and B were put together and mixed, and the amine in the mixture was quantitatively recovered by the operation usually conducted in the separation and purification section in the amine production plant. The recovery ratio of the amine was 89% based on the total amount of the amine in 205 l of the waste water treated by the amine adsorbing step and the amine in solution B obtained in Example 48. Solution C of this Example was, without being disposed, used as water for dissolving solid sodium chloride obtained as a by-product from the amine production plant, and the obtained aqueous solution of the by-product salt was adjusted to pH 11.4 and then subjected to adsorption treatment with active carbon for recovery. By conducting this operation, the amine in the waste water was recovered at a ratio of 99.3%, whereby discharge of the amine out of the plant system was almost completely controlled and a completely closed system was established.

What is claimed is:

1. A method for treating an amine-containing waste water, which comprises contacting the waste water with coconut shell active carbon;
    wherein said waste water is a waste water containing ethyleneamine and sodium chloride, discharged from a process for producing ethyleneamine by using dichloroethane and ammonia.

2. A method for treating an amine-containing waste water, which comprises contacting the waste water with active carbon in the presence of at least $5 \times 10^{-4}$ mol/l of an alkali metal hydroxide and/or an alkaline earth metal hydroxide.

3. The method according to claim 2, wherein at least 10 g/l of an inorganic salt is also present during the contact.

4. The method according to claim 2, wherein the amine-containing waste water is a waste water containing ethyleneamine and sodium chloride, discharged from a process for producing ethyleneamine by using dichloroethane and ammonia.

5. The method according to claim 2, wherein the active carbon is coconut shell active carbon.

6. A method for treating with active carbon an amine-containing waste water or a waste water containing an inorganic salt and an amine, discharged from a plant for producing an amine by the reaction of an organic halogen compound and a nitrogen-containing compound, which comprises:
    (1) a step of adsorbing the amine by adding an alkali metal hydroxide or an alkaline earth metal hydroxide to said waste water to adjust the pH to a level of at least 10.8 and contacting the mixture with active carbon in a column packed with active carbon,
    (2) a step of desorbing the amine by supplying a desorbing solution containing a mineral acid at a concentration of from 2 to 20% by weight, to said column packed with active carbon having the amine adsorbed thereon, at a linear velocity of from 0.1 to 15 m/hr thereby producing a desorbed amine solution, and (3) a step of recovering the amine by supplying the desorbed amine solution to an amine production plant.

7. The method according to claim 6, wherein an alkali metal hydroxide or an alkaline earth metal hydroxide is added to a desorbed amine solution having an amine concentration of less than 30 g/l from the amine desorbing step (2), to adjust the pH to a level of at least 10.8 and recycling the mixture to the active carbon packed column as a feed solution for the amine adsorbing step (1).

8. The method according to claim 6, wherein a mineral acid is added to a desorbed amine solution having an amine concentration of less than 50 g/l from the amine desorbing step (2), to adjust the concentration of the free mineral acid to a level of from 2 to 20% by weight and the mixture is used as a desorbing solution for the amine desorbing step (2).

9. The method according to claim 6, wherein the amine-containing waste water or the waste water containing an inorganic salt and an amine, is an ethyleneamine-containing waste water or an ethyleneamine-containing waste water which contains sodium chloride and/or calcium chloride, discharged from a plant for producing ethyleneamine by using dichloroethane and ammonia.

10. The method according to claim 6, wherein the active carbon is coconut shell active carbon.

11. The method according to claim 6, wherein the mineral acid is hydrochloric acid.

* * * * *